(No Model.) 2 Sheets—Sheet 1.
E. F. BELDING.
COUNTER SKIVING MACHINE.
No. 390,551. Patented Oct. 2, 1888.
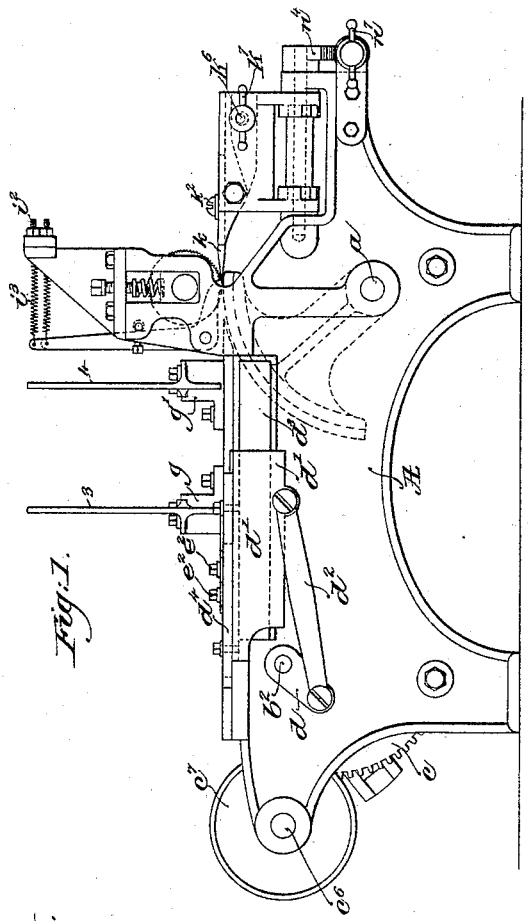
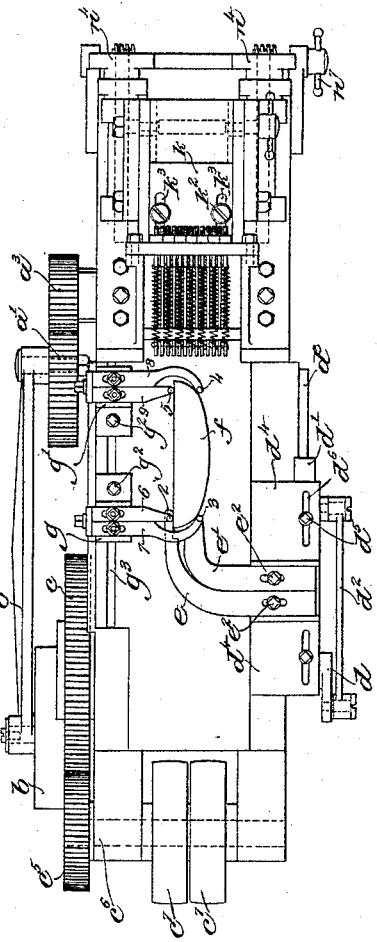
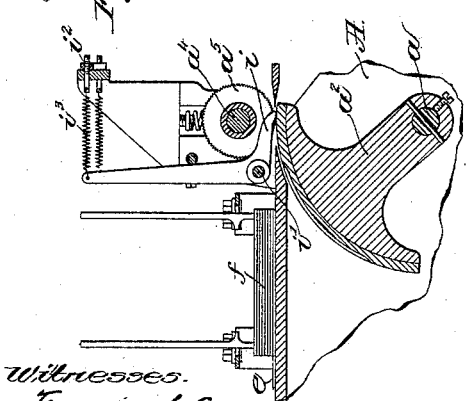
Witnesses.
Frederick L. Emery.
Fred. S. Greenleaf.
Inventor.
Edgar F. Belding
by Crosby & Gregory
Attys (No Model.) 2 Sheets—Sheet 2.
E. F. BELDING.
COUNTER SKIVING MACHINE.
No. 390,551. Patented Oct. 2, 1888.
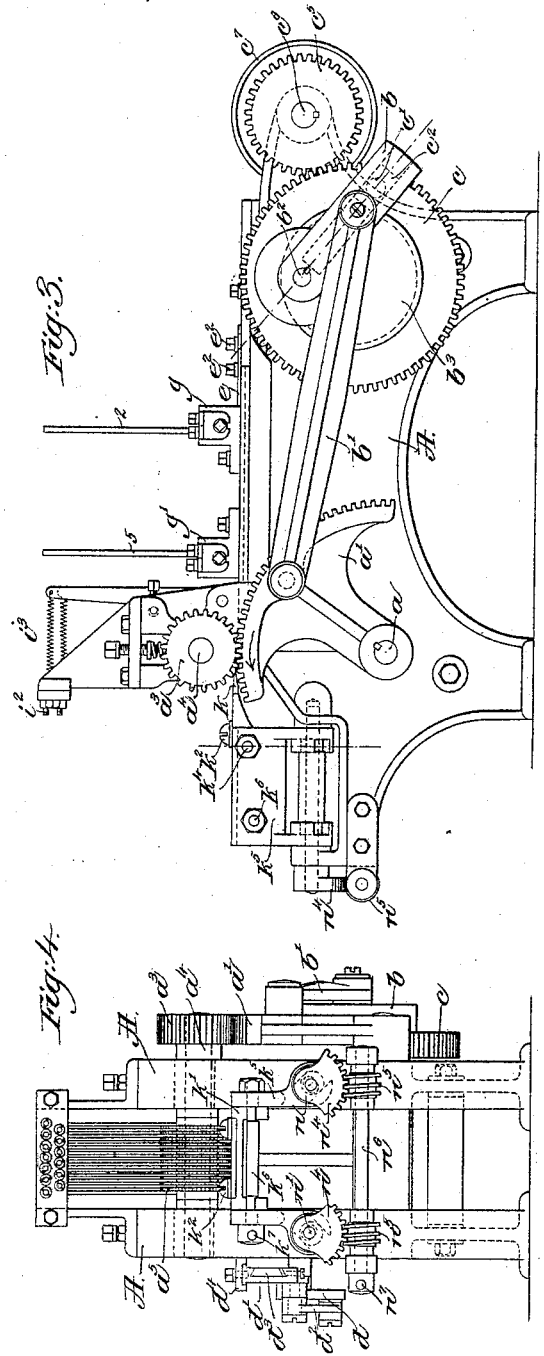
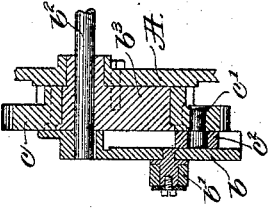
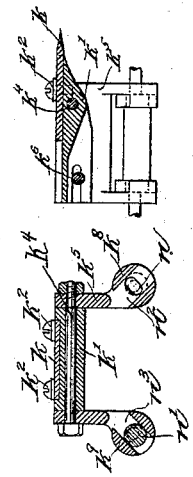
Witnesses.
Frederick L. Emery.
Fred S. Greenleaf.
Inventor.
Edgar F. Belding
by Crosby & Gregory
Attys.

UNITED STATES PATENT OFFICE.

EDGAR F. BELDING, OF FITCHBURG, MASSACHUSETTS.

COUNTER-SKIVING MACHINE.

SPECIFICATION forming part of Letters Patent No. 390,551, dated October 2, 1888.

Application filed June 25, 1888. Serial No. 278,159. (No model.)

*To all whom it may concern:*

Be it known that I, EDGAR F. BELDING, of Fitchburg, county of Worcester, State of Massachusetts, have invented an Improvement in Counter-Skiving Machines, of which the following description, in connection with the accompanying drawings, is a specification, like letters on the drawings representing like parts.

This invention has for its object to construct a machine for skiving counters for boots and shoes.

In accordance with this invention an oscillating mold is employed, together with reciprocating feed-wheels. Independent spring-actuated pressers are also employed, which, by bearing down or pressing upon the counter, press it into the mold, so that its edges only may be exposed to be shaved off or skived. A quick-return crank-motion is provided by which the oscillating mold may be moved forward slowly, thereafter to its normal position or starting-point quickly, the counter being placed in and fed upon the mold during its forward movement. The counters to be fed forward and skived are placed in a pile and the undermost one removed at each oscillation of the mold by suitable plates or blades mounted upon a carrier which is driven by the quick-return crank-motion. A knife is adjustably secured to a frame which is pivoted in a holder mounted upon suitable shafts having eccentric hubs, to be described, whereby the said holder may be rocked and the knife thereby raised and lowered, and, in addition to such adjustment, the knife is made adjustable toward and from the mold.

Figure 1 shows a front elevation of a counter-skiving machine embodying this invention; Fig. 2, a top or plan view of the machine shown in Fig. 1; Fig. 3, a rear side view of the machine shown in Fig. 1; Fig. 4, a left-hand end view of the machine shown in Fig. 3; Fig. 5, a detail of the mold, the reciprocating feeding devices, and the frame in which the counters are placed; Fig. 6, a sectional detail of the quick-return crank-motion; and Figs. 7 and 8, sectional details of the knife-holder, to be referred to.

The main frame-work A is of suitable shape to support the working parts. The shaft $a$, mounted in the frame-work A, has fixed to it at one end the toothed sector $a'$, and also at an intermediate point has fixed to it a counter-receiving mold, $a^2$. The toothed sector $a'$ meshes with the teeth of a wheel, $a^3$, fixed on a shaft, $a^4$, which shaft also has its bearings in the main frame-work A. Upon the shaft $a^4$ are also secured several toothed or serrated feed wheels or surfaces, $a^5$, herein shown as twelve in number, and placed a short distance apart. The sector $a'$ is connected to a crank-arm, $b$, by a link, $b'$, and said crank-arm $b$ is fixed to a shaft, $b^2$, having its bearings in the main frame-work A. A circular hub, $b^3$, is also secured to the main frame-work, (see Figs. 3 and 6,) the center of which is eccentric to the pivot $b^2$ of the crank-arm $b$. A toothed wheel, $c$, is loosely mounted upon the circular hub $b^3$, said toothed wheel having projecting laterally from it near its periphery a pin, $c'$, which enters a block, $c^2$, fitting and sliding in a guideway or slot formed longitudinally on the under side of the arm $b$. A toothed wheel, $c^5$, is fixed to a shaft, $c^6$, having its bearings in the frame-work, said shaft $c^6$ also having fixed thereon the drive-wheels $c^7$.

It will be seen that as the drive-shaft $c^6$ is rotated the toothed wheel $c$ will in turn be revolved and the crank-arm $b$ be moved on its pivot $b^2$ by the pin and slide-block $c'$ $c^2$, and that the toothed sector $a'$ will also be thereby oscillated by the link and crank-arm, as described. It will further be seen that by the construction of the crank and its operating parts, as shown and described, a quick-return crank-motion is formed, by which the sector $a'$ will be moved in the direction of the arrow thereon slowly, but will return quickly.

At the opposite side of the machine (see Fig. 1) a crank-arm, $d$, is fixed to the shaft $b^2$, and is connected by a link, $d^2$, with a horizontally-movable carrier, $d'$. The carrier $d'$ has a groove upon its inner side, which fits a dovetail projection, $d^3$, formed upon the side of the frame-work A, which projection serves as the guide therefor. A plate, $d^4$, is secured adjustably upon the carrier $d'$ by set-screws $d^5$, which pass through slots $d^6$, cut in said plate $d^4$, and thence into the carrier, the slots $d^6$ extending in the direction of the length of the plate $d^4$, thereby affording longitudinal adjustment.

Two blades, $e$ $e'$, bent at right angles, as best shown in Fig. 2, are adjustably secured to the plate $d^4$ of the carrier by set-screws $e^2$, which pass through slots in said blades and into the plate. The ends of the blades $e$ $e'$ are made thin and arranged to follow closely upon the upper surface of the bed or table of the machine upon which the pile of counters $f$ to be skived is placed.

The counters $f$ to be skived are held in place in a frame composed of four posts, 2 3 4 5, rising from plates 6 7 8 9, each of which plates is adjustably secured by set-screws to the blocks $g\ g'$, which are supplied with guide-pins $g^2$, the heads of which pins enter dovetailed or, it may be, T-shaped grooves $g^3$, cut in the upper surface of the bed or table.

The blocks $g\ g'$ are adjustable longitudinally and the plates 6 7 8 9 transversely, so as to provide adjustment for counters of different sizes and thicknesses.

As the counters are fed forward by the blades $e\ e'$ they pass beneath the reciprocating feed-wheels $a^5$ and the oscillating mold $a^2$, and are pressed down into the recess in the mold by a series of presser-feet, $i$, herein shown as bent levers pivoted at $i'$, the horizontal arms of which serve as the presser-feet, and the upwardly-extended arms of which are connected with adjusting screws $i^2$ by springs $i^3$, so that the tension of the presser-feet may be varied at will.

One presser-foot is shown as placed between each feed-surface $a^5$, and acts to press the counter into the recess in the molds, leaving exposed above the surface of the mold the edge to be skived or shaved off.

The knife $k$ is secured adjustably by screws $k^2$ to a plate, $k'$, said screws passing through slots $k^3$ in said knife. The plate $k'$ is pivoted upon the rod $k^4$, having its bearings in the frame $k^5$. The rear end of the frame $k^5$ is slotted to receive eccentric hubs of a shaft, $k^6$, to which shaft is fixed the hand-piece $k^7$, so that by turning the said shaft $k^6$ the frame $k^5$ will be raised and lowered on its pivot $k^4$.

The knife thus far described may be adjusted toward and from the presser-feet, and also may be raised and lowered as desired.

The plate $k'$ is held in the frame $k^5$, which frame has two ears, $k^8$, upon one side and two ears, $k^9$, upon the other side. The ears $k^8\ k^9$ have holes through them, which receive shafts $n\ n'$. Each shaft $n\ n'$ has two eccentrically-arranged hubs thereon, which enter diagonal slots or passages $n^2\ n^3$ cut in the ears, respectively. Toothed sectors $n^4$ are fixed to the ends of the shafts $n\ n'$, which are engaged by worms $n^5$, formed on or secured to the shaft $n^6$, which is adapted to be rotated by the hand-piece $n^7$.

When the hand-piece $n^7$ is turned in one direction, the sectors $n^4$ are moved simultaneously in one direction and the shafts $n\ n'$ rotated, so that the eccentrically-arranged hubs cause the frame $k^5$ to rock in one direction, and by turning the hand-piece $n^7$ in the opposite direction the frame $k^5$ may be rocked in the opposite direction.

The frame $k^5$ and pivoted plate $k'$ form the knife-holder.

I do not desire to limit my invention to the precise construction of some of the principal features of this invention, as the same may be modified and yet carry out the desired results.

I claim—

1. In a counter-skiving machine, the oscillating mold $a^2$ and the independent spring-actuated presser-feet, combined with the reciprocating feed-wheels between the said presser-feet and the knife, substantially as described.

2. In a counter-skiving machine, the oscillating mold, feed-wheels, and knife, combined with mechanism, substantially as described, to give the quick return crank motion for the said mold, as and for the purpose specified.

3. In a counter-skiving machine, the mold and feeding devices and presser-feet, combined with the knife and the rocking or knife-tilting holder to which it is adjustably attached, substantially as described.

4. In a counter-skiving machine, the mold, feed-wheels, and presser-feet, combined with the knife, the rocking or tilting holder to which it is adjustably attached, and means, substantially as described, for rocking and tilting said holder, substantially as described.

5. In a counter-skiving machine, the mold, feeding devices, and presser-feet, combined with the knife and the knife-holder, movable by mechanism substantially as described on an axis parallel with the axis of the mold, and also on an axis at right angles to the aforesaid axis, substantially as described.

6. In a counter-skiving machine, the mold, feeding devices, and presser-feet, combined with the knife, the holder to which said knife is adjustably attached, and means, substantially as described, for rocking or tilting said holder on an axis at right angles to the axis of the mold, substantially as described.

7. In a counter-skiving machine, the mold, feeding devices, and presser-feet, combined with the counter-holder composed of the posts 2 3 4 5, made adjustable longitudinally and transversely, substantially as described.

8. In a counter-skiving machine, the mold, feeding devices, and presser-feet, combined with the counter-feeding blades $e\ e'$ and the carrier to which said blades are adjustably attached, substantially as described.

9. In a counter-skiving machine, the mold, feeding devices, and presser-feet, combined with the counter-feeding blades, carrier therefor, and mechanism, consisting of the sector-link and slotted crank-arm, to give the quick return crank motion, substantially as described, for the said carrier, substantially as set forth.

In testimony whereof I have signed my name to this specification in the presence of two subscribing witnesses.

EDGAR F. BELDING.

Witnesses:
BERNICE J. NOYES,
J. C. SEARS.